UNITED STATES PATENT OFFICE.

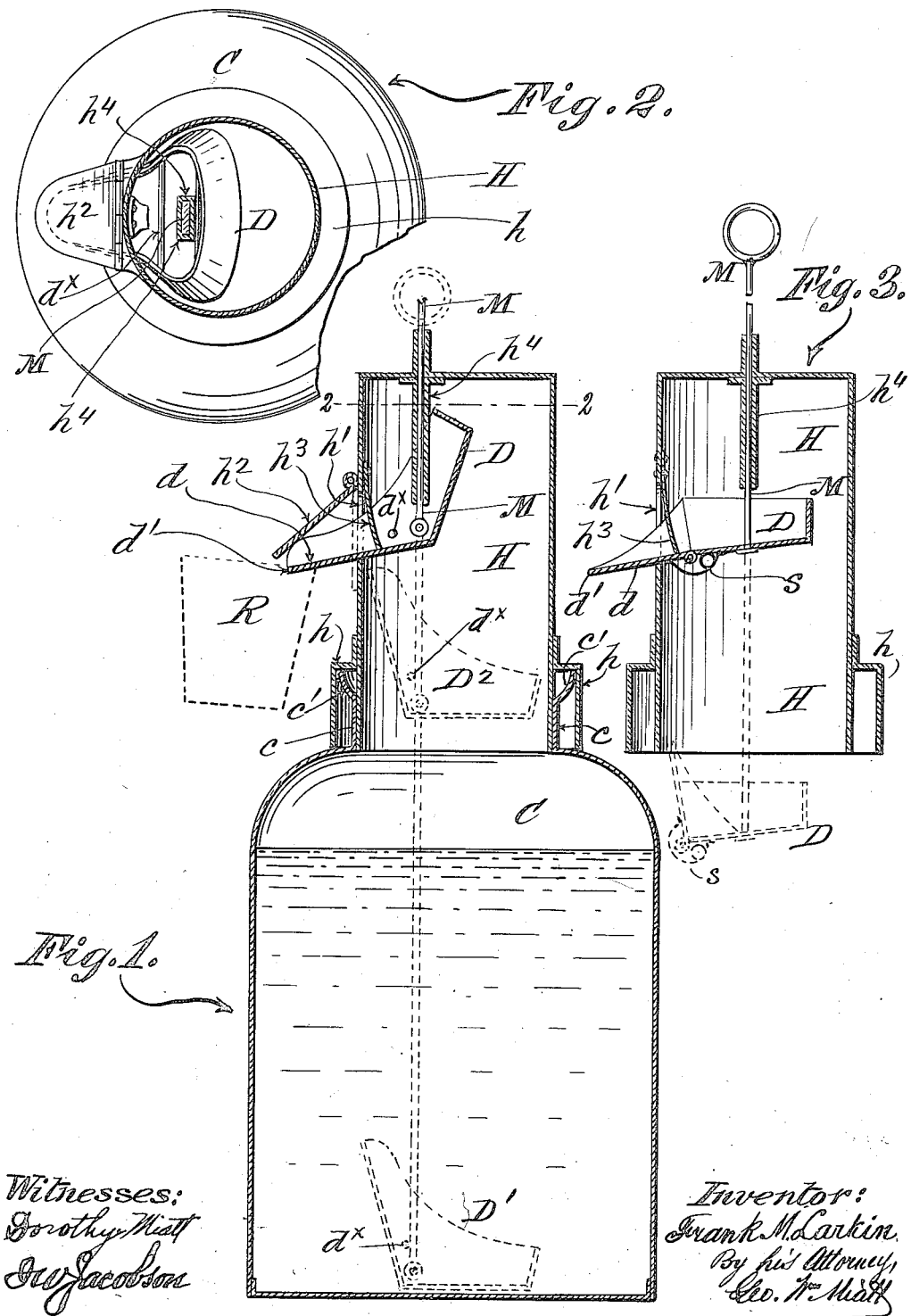

FRANK M. LARKIN, OF NEW YORK, N. Y., ASSIGNOR TO HARRY C. LYONS, OF NEW YORK, N. Y.

LIQUID-DISPENSER.

1,288,621.  Specification of Letters Patent.  Patented Dec. 24, 1918.

Application filed December 18, 1917. Serial No. 207,669.

*To all whom it may concern:*

Be it known that I, FRANK M. LARKIN, a citizen of the United States, and a resident of the borough of Manhattan, city, county, and State of New York, have invented certain new and useful Improvements in Liquid-Dispensers, of which the following is a specification.

My improvements are applicable to the measuring and dispensing of liquids of various kinds, and especially for the dispensing of milk direct from the shipping can in a convenient and sanitary manner, at the same time attaining a proper and requisite proportional admixture of all of the liquid constituents so that the milk dispensed is of standard quality.

The invention consists in the specific combination and arrangement of parts described and claimed herein, distinctive features being the hood which is substituted for the usual milk can cover and is formed with a lateral delivery port, and in conjunction therewith the use of a dipper which may be automatically tripped in whole or in part to discharge a prescribed quantity of milk through said delivery port, all as hereinafter fully set forth.

In the accompanying drawings,

Figure 1, is a central vertical sectional elevation of a shipper's milk can of standard shape, with my measuring and dispensing means applied thereto;

Fig. 2, is a transverse horizontal section taken upon plane of line 2—2, Fig. 1;

Fig. 3, is a sectional elevation of my milk can attachment showing a modification.

I herein show and describe my invention as embodied in means for the measuring and dispensing of milk, although, as heretofore intimated, I do not limit myself thereto, since various other liquids may in like manner be so measured and dispensed without departing from the spirit and intention of my invention,—the apparatus being modified but slightly in conformity with the special requirements of the liquid to be dispensed.

With this understanding, C, represents a shipper's milk can of ordinary standard configuration, $c$, being the neck formed with the usual flared mouth rim $c'$,—the neck $c$, being closed during transportation and storage by a flanged cover (not shown) fitting therein and in the mouth rim $c'$, in a manner well known in the art. This regulation cover is removed from the neck of the can C, when it is desired to dispose of the contents thereof, and my dispensing hood H, is then substituted therefor. The hood H, is by preference of cylindrical shape, its lower end fitting snugly within the neck $c$, of the can C, and it being formed with an external flange $h$, which fits over the flared mouth rim $c'$, of the can, as shown in Fig. 1. The hood H, is formed with a lateral discharge or delivery aperture $h'$, covered normally by a flap door $h^2$, or equivalent closure device; and a trip $h^3$, affixed to a stationary part is so positioned with relation to said discharge aperture $h'$, as to contact with the inner inclined surface of the spout section $d$, of the dipper D, when the latter is raised sufficiently.

The dipper D, is attached to the lower extremity of the manipulating rod M, which latter is angular in cross section, fitting in a correspondingly shaped guide sleeve $h^4$, rigidly attached to the hood H, by which means the manipulating rod M, is prevented from turning laterally and is held in alinement while admitting of its being raised or lowered vertically to manipulate the dipper D, such manipulation being automatic however in so far as the action of the dipper itself is concerned. That is to say the main function of the manipulating bar or rod M, is simply to raise and lower the dipper D, and its length is sufficient to allow the dipper D, to descend to the bottom of the milk can C, as indicated by dotted lines D', in Fig. 1,— the dotted lines $D^2$, in said Fig. 1, indicating the position of the dipper just prior to or after contact with the trip $h^3$.

In Fig. 1, the dipper D, is shown as pivotally attached to the lower end of the manipulating rod M, so that when the inclined surface of the spout section $d$, of the dipper D, contacts with the lower end of the trip $h^3$, the latter will rock the dipper D, when raised sufficiently, into the position shown in solid lines in the upper part of Fig. 1, with the spout $d'$, protruding through the delivery opening $h'$, in the side of the hood H, thus discharging the contents of the dipper D, into a glass or other receptacle placed to receive same, as indicated by the dotted lines R, in said Fig. 1.

In the modification shown in Fig. 3, the main portion of the dipper D, is attached rigidly to the lower end of the manipulating rod M, and the spout section $d$, of the dipper D, is pivotally attached thereto and held normally closed against the main portion of the dipper by a spring $s$, which however allows the spout section $d$, to yield when in contact with the trip $h^3$,—the action being essentially the same as shown in Fig. 1, except that the spring $s$, tends constantly to close the spout section $d$, whereas in Fig. 1, the main portion of the dipper acts as a counterweight to perform the same function. It will be seen that the lower end of the trip $h^3$, protrudes into the upward path of the inclined spout section $d$, of the dipper D, so as to deflect the spout $d'$, through the delivery opening $h'$, in the hood H, when the dipper is fully raised; and the spout $d'$, automatically pushes open the closure $h^2$, which coöperates with the sides of the spout section $d$, in guiding the discharge flow of milk from the tilted dipper.

The holding capacity of the dipper D, is regulated according to requirements so that it may be made to perform the double function of a milk abstracting and measuring device by means of which a prescribed quantity of milk and cream may be dispensed. A third function of the dipper D, and manipulating rod M, is that of an agitator to promote the admixture of the liquid constituents in the can C. Thus it is well known that the cream and lighter constituents of milk tend to separate from the heavier constituents or "skimmed milk", and the frequent raising and lowering of the dipper counteracts this tendency, although if the dipper D, is lowered to the bottom of the can after each delivery of milk it is obvious that when again raised for a like purpose it will pass through both the heavier and lighter constituents of the milk and take up an admixture thereof. Nevertheless the use of the manipulating rod M, and dipper D, as a means of agitating and mixing the liquid constituents is advantageous in practice, and being effected by parts entirely inclosed and self contained within the can C, and hood H, such agitation is effected under sanitary conditions and without exposure to the external atmosphere.

If the dipper D, is pivotally attached to the manipulating rod M, as in Fig. 1, it may be provided with a stop $d^x$, for contacting with said rod when the dipper is in normal position to maintain the holding capacity of the dipper which capacity is limited to and by the height of the inner edge $d'$, thereof.

The hood H, not only supports the dispensing means but by excluding extraneous air and matter renders the device sanitary in every respect. At the same time the whole contrivance can be quickly and conveniently applied to or detached from a shipping can or other receptacle for milk, and the parts may be readily cleansed and sterilized by scalding or otherwise.

It is obvious that it is not material whether the trippable spout portion $d$, of the dipper is made integral with the dipper as in Fig. 1, or is pivotally and resiliently attached to the main portion of the dipper as in Fig. 3,— the result attained being the same in either case. Hence by the term trippable spout portion of the dipper I mean to include any modification that will answer the same purpose.

My sanitary apparatus for dispensing "loose" milk from the original package, as it were, is especially suited for use in institutions, hotels, restaurants, groceries, dairies and all situations where large quantities of milk are to be served. Aside from the raising and lowering of the manipulating rod it is entirely automatic in action, and may be operated quickly and conveniently, either continuously or intermittently according to requirements.

What I claim as my invention and desire to secure by Letters Patent is,

1. Liquid dispensing apparatus of the character designated, comprising a hood having an external flange to rest upon the crown of a liquid receptacle, said hood adapted to fit over and inclose the entrance to such receptacle and opening thereinto and formed with a lateral delivery aperture, a manipulating rod slidably mounted on and in said hood, a dipper mounted on the lower portion of said rod and formed with a trippable spout portion, and a trip fixed to the inner wall of said receptacle and arranged to be engaged by the inner bottom wall of the spout of the dipper to deflect said trippable spout portion of the dipper and protrude its end through the delivery aperture in such manner that the contents of the dipper is discharged through said delivery opening in the hood, for the purpose described.

2. Liquid dispensing apparatus of the character designated, comprising a hood having an external flange to rest upon the crown of a liquid receptacle, said hood adapted to fit over and inclose the entrance to such receptacle and opening thereinto and formed with a lateral delivery aperture, a manipulating rod slidably mounted on and in said hood, a dipper mounted on the lower portion of said rod and formed with a trippable spout portion, a trip fixed to the inner wall of said receptacle and arranged to be engaged by the inner bottom wall of the spout of the dipper to deflect said trippable spout portion of the dipper and protrude its end through the delivery aperture in such manner that the contents of the dipper is discharged through said delivery opening in the hood, and an automatically actuated closure for said delivery opening.

3. Liquid dispensing apparatus of the character designated, comprising a hood having an external flange to rest upon the crown of a liquid receptacle, said hood adapted to removably fit over and inclose the entrance to such receptacle and opening thereinto and formed with a lateral delivery aperture, a manipulating rod slidably mounted on and in said hood, a dipper mounted on the lower portion of said rod and formed with a tippable spout portion, and a trip mounted within said hood adjacent the delivery aperture in position to be engaged by the inner bottom wall of the spout of said dipper when the latter is raised, to tip the spout and project it through said aperture.

4. Liquid dispensing apparatus of the character designated, comprising a hood having an external flange to rest upon the crown of a liquid receptacle, said hood adapted to removably fit over and inclose the entrance to such receptacle and opening thereinto and formed with a lateral delivery aperture, a manipulating rod slidably mounted on and in said hood, a dipper mounted on the lower portion of said rod and formed with a tippable spout portion, and a trip mounted within said hood adjacent the delivery aperture in position to be engaged by said dipper when the latter is raised, to tip the spout and project it through said aperture, said trip being disposed opposite said delivery aperture, and the spout portion of the dipper being pivotally mounted and normally in closed position.

FRANK M. LARKIN.

Witnesses:
 DOROTHY MIATT,
 GEO. WM. MIATT.